United States Patent Office 3,131,796
Patented May 5, 1964

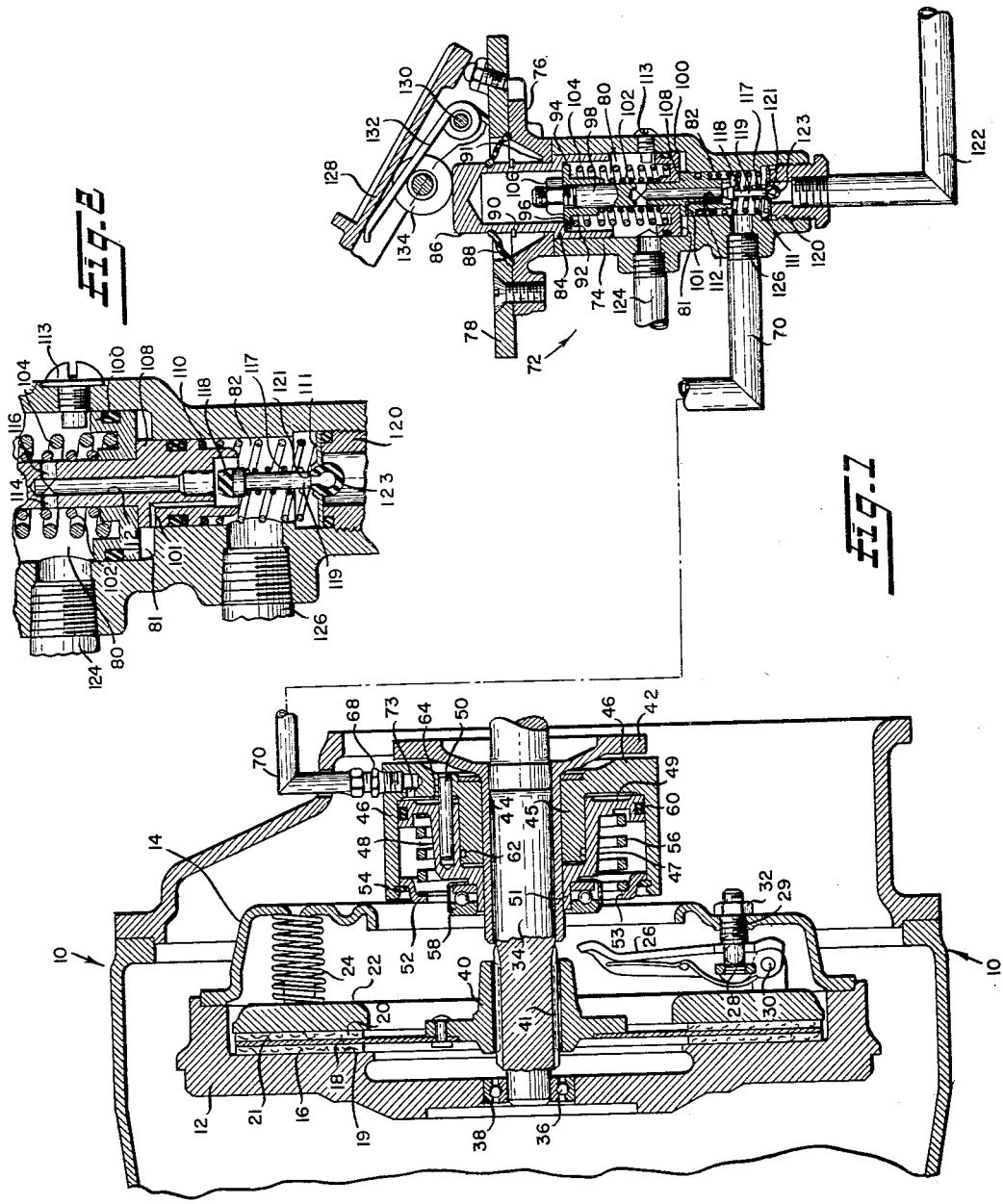

3,131,796
FRICTION CLUTCH CONTROL
Phineas R. Youngs III, Grosse Ile, Mich., assignor to Rockwell-Standard Corporation, Coraopolis, Pa., a corporation of Pennsylvania
Filed Aug. 15, 1960, Ser. No. 49,515
2 Claims. (Cl. 192—85)

This invention relates to automotive friction clutch devices and more particularly to operating and control means therefor.

In friction clutches such as customarily employed in automotive power plant units between the power plant and the transmission gearing it is conventional to employ a foot pedal or hand lever operated linkage to axially displace a shift sleeve on the clutch shaft to engage and move pivoted release levers within the clutch housing to disengage the clutch during shifting of the gears. Because of wear on the friction surfaces of the clutch plates during the cycles of engaging and disengaging, after a certain time an increasingly longer stroke of the linkage and more pressure is needed to disengage the clutch and it eventually becomes necessary to manually readjust the clutch throwout linkage. Satisfactory operation of the clutch becomes cumulatively more difficult as the need for adjustment approaches.

A further disadvantage of such conventional clutch operating mechanisms is the wear and breakage encountered in the usual linkage system. Conventional clutch control linkage does not provide a smooth engagement of the clutch after disengagement, unless properly maintained, and this frequently results in objectionable gear clashing except when a synchronizing gear arrangement is incorporated.

These and other disadvantages of conventional clutch operating mechanisms are eliminated by the present invention which provides a novel fluid actuated clutch operating mechanism employing a fluid motor operably connected to the clutch mechanism and controlled through a foot pedal or hand lever.

Accordingly, it is the major object of the present invention to provide a novel and unique air or other fluid actuated clutch operating mechanism which is self-adjusting and not subject to wear and frequent maintenance and which provides smooth instant clutch release and engagement to prevent clashing of the transmission gears.

Another object of the present invention is to provide in a transmission disconnect friction clutch an "around-the-shaft" fluid or air cylinder embodying an axially movable piston to be brought in contact with the release levers of the clutch assembly to disengage the clutch plates.

Still another object of the present invention is the provision of an air or other fluid pressure motor clutch actuator which operates smoothly and uniformly without adjustment or other maintenance throughout the life of the clutch plates.

A further object of the present invention is the provision of the combination of a foot pedal or hand lever operated balanced metering valve with an operatively connected friction clutch actuating motor to obtain controlled clutch engagement and disengagement.

The above and other objects and novel features will become more evident from the following detailed description in connection with the appended drawing which illustrates in FIGURE 1 an automotive transmission disconnect clutch according to a preferred embodiment of the present invention in which a foot pedal operated metering valve for the clutch actuating motor is shown on a slightly larger scale than the clutch for clarity of disclosure, and in FIGURE 2 a fragmentary larger scale view of the lower portion of the metering valve.

The invention is disclosed as embodied in a single plate dry disk clutch assembly, although it will be understood that it is applicable to any other similar friction clutch, for example either multiple dry disk or wet friction clutches having multiple lever engagement and single or multiple release springs.

The friction clutch structure at the left in the drawing is contained in a flywheel and clutch housing 10 enclosing a rotating flywheel 12 connected as by a driving flange (not shown) to an engine driven shaft (not shown). Rigidly attached to driven flywheel 12 is a clutch cover 14 enclosing a conventional friction disk 16, a driven plate 18 and a friction disk 20.

The friction disks 16 and 20 are secured as by rivets on opposite sides of plate 18 and are adapted to engage respectively with flywheel face 19 and face 21 of a pressure plate 22 axially slidably carried by clutch cover 14. A series of equally circumferentially spaced coil springs 24 are compressed between pressure plate 22 and cover 14.

A number of spring loaded clutch release levers 26 are pivoted at 28 on clutch cover 14 and operably connected to the pressure plate 22 at 30. The levers 26 are equally circumferentially spaced around the clutch axis and each pivot 28 is carried by a post 29 mounted on cover 14. The position of the release levers 26 may be manually adjusted as by the nut assembly 32 to shift pivot 28 axially.

In order to disengage the clutch, release levers 26 may be pivoted around their pivots 28 counterclockwise whereby the pressure plate attachment at 30 swings to the right and separates the friction disks and related faces from driving engagement, this being done against the forces of the coil springs 24. This has been accomplished in the past by a mechanically operated linkage and shift sleeve but the present invention improves upon that.

Centrally located within the housing 10 is a transmission input shaft 34 piloted at one end in bearing 36 in aperture 38 in flywheel 12 and adapted to transmit driving power from the engine through the clutch to the usual change speed gear transmission when the clutch is engaged. A hub 40 is slidably splined at 41 upon shaft 34 and carries the flexible drive plate 18. Thus, when the full force of springs 24 acting through plate 22 engages the friction disks 16 and 20 with faces 19 and 21 the clutch is engaged to transmit power. Hub 40 may shift axially and plate 18 may flex slightly during clutch engagement. This is conventional.

A stationary bearing cap or support flange 42 is preferably attached to the transmission housing (not shown). Flange 42 has an inwardly extended sleeve 44 which surrounds shaft 34 and terminates at the splined section 41. A cylinder 46 surrounds and is fixed to sleeve 44 and contains an axially movable piston 48 guided for axial reciprocation and prevented from rotation about its axis by one or more locating pins 50 fixed on the cylinder end wall. Sleeve 44, flange 42 and cylinder 46 may be made in one piece if preferred.

The open inwardly directed end of cylinder 46 carries a removable annular retaining plate 52 held against movement to the left by a snap ring and groove assembly 54. The piston 48 is held in the illustrated retracted position by a coil return spring 56 and compressed between an end flange 49 of the piston and the retaining plate 52.

The hub 47 of the piston 48 which slides on the smaller diameter internal cylinder wall 45 has a reduced diameter annular extension 51 extending outwardly of cylinder 46 through aperture 53 of retaining plate 52, and this extension 51 is slidable along the flange sleeve 44. A clutch throw-out bearing 58, which is a shielded ball bearing assembly is mounted on the piston extension 51 substantially within aperture 53 so as to be axially movable with the piston 48 to simultaneously contact all the release levers 26 when piston 48 is displaced to the left as viewed in FIGURE 1. External and internal O ring seals 60 and 62 respetively in the piston and/or cylinder walls are provided to seal the fluid pressure chamber 64 within the cylinder 46 against escape of air or other pressure fluid.

A fluid pressure inlet and return fitting 68 is screwed radially into the rear cylinder wall to provide connection to a supply conduit 70 extending through the clutch housing and connected to a metering operator valve generally indicated at 72. A conduit 73 connects the fitting 68 with the cylinder chamber 64.

Valve 72 comprises an elongated cylindrical housing 74 attached to a flange 76 which is secured to the baseboard 78 in the driver compartment of a vehicle. Housing 74 comprises essentially an upper larger chamber 80 and lower smaller inlet chamber 82. The upper chamber 80 contains a hollow piston 84 extending a distance upwardly and outwardly of chamber 80 through flange 76 and baseboard 78 to terminate in a top knob 86. A bellows type seal 88 between the cylinder upper end and flange 76 prevents entry of dirt, moisture and like foreign matter into the valve mechanism. A snap ring 90 may coact with ledge 91 of flange 76 to limit the downward movement of piston 84.

The downwardly open recessed cavity 92 of piston 84 contains a flanged retainer 94 which seats against shoulder 96 within piston 84 and slidably receives a rod 98 extending through chamber 80. Rod 98 receives at its lower end a slidable piston cup 100 reciprocable within the lower part of chamber 80. Cup 100 is biased downwardly away from retainer 94 by a coil compression spring 104. Another smaller coil spring 102 coacts with spring 104 upon balanced piston displacement as will be explained. The upper end of rod 98 is threaded to mount a nut 106 for adjustment of the position of retainer 94 along rod 98, and disassembling.

Lower piston cup 100 in chamber 80 abuts against the upper end of another diametrically smaller piston 108, which is preferably integral with rod 95, that is vertically slidable in lower chamber 82 and extends partly into the upper chamber 80. Piston 108 is biased into engagement with piston cup 100 by a coil compression spring 110 reacting from an aperture closure plate 111 closing the lower end of chamber 82. A stop 113 limits upward movement of piston cup 100.

A vertical exhaust passage 112 is bored through piston 108 and rod 98 with radial openings 114 and 116 into the upper chamber 80. A valve 118 is made of rubber or like material is provided to close exhaust passage 112 upon actuation of the treadle valve. The stem 119 of valve 118 extends through inlet port 121 in closure plate 111 and is provided at its other end with another similar rubber valve member 123 which normally keeps the inlet port 121 closed by means of the expansion of coil spring 117 placed between the exhaust valve 118 and closure plate 111 pressing the inlet valve 123 against the seat surrounding opening 121 in closure plate 111.

An inlet fitting 120 at the lower end of the cylinder housing 74 connects chamber 82 through port 121 to conduit 122 from the fluid pressure supply tank (not shown).

The upper exhaust or atmosphere chamber 80 is normally open above piston 100 to an exhaust conduit 124, whereas lower chamber 82 is connected at 126 to the friction clutch cylinder inlet and return conduit 70. A small diameter metering passage 101 extends through piston 108 to place chamber 82 in communication with a pressure balancing chamber 81 formed underneath piston cup 100 in the lower end of chamber 80 so that pressure of inlet conduit 122 is transmitted to the underside of piston 108 during the time the treadle valve is operated to disengage the clutch.

Thus the drawing shows the condition of the parts when the vehicle is operative and the clutch is engaged. A positive drive is maintained between flywheel 12 and shaft 34 through plate 18 and hub 40, the clutch engagement being maintained by expanded springs 24.

During this period of clutch engagement the fluid pressure of inlet conduit 122 is shut-off from chamber 82 and consequently from clutch conduit 70 by means of the valve 123, return air or fluid having been exhausted through open valve 118, passages 112, 114 and 116 into chamber 80 and through outlet 124 to atmosphere.

Since piston 48 is of relatively small mass and supported for substantially frictionless sliding in cylinder 46, the motor is particularly sensitive to any change in force balance, so that even a small increase in the force applied in chamber 64, as by an increase in the fluid pressure, will immediately and smoothly become effective to shift piston 48 toward levers 26.

To actuate metering valve 72 a foot pedal 128 may be pivoted at 130 on the vehicle floor and biased clockwise toward disengaged position by spring 132. The downward force of the foot pedal 128 is transmitted by a roller 134 to the piston knob 86 to displace piston 84 downwardly. Normally the combined spring forces acting on the pedal and piston 84 maintain the pedal as shown and piston 84 in its uppermost position. Instead of the foot pedal a hand operated lever (not shown) or any other convenient means may be employed to actuate the metering valve 72.

To disengage the friction clutch, foot pedal 128 is depressed moving piston 84 downward. This force is transmitted through retainer 94 and coil springs 102 and 104 to piston cup 100. Upon downward displacement, piston cup 100 urges piston 108 positively downwardly into chamber 82, closing the exhaust passage 112 by means of valve 118. Further downward movement of piston 108 against the spring 110 consequently unseats the inlet valve 123 from opening 121 by means of the stem connection 119 with valve 118. Pressurized air or fluid from inlet conduit 122 is then free to flow through inlet 121 into chamber 82 and into clutch conduit 70 from which it passes into clutch cylinder chamber 64 to displace piston 48 to the left causing throw-out bearing 58 to contact release levers 26, and upon further movement to rock those levers to separate the friction surfaces and interrupt power transmission to shaft 34. Because of the sensitivity of the metering treadle valve 72 and unique coaction of the clutch actuator motor at 46 positive and instant smooth disengagement of the clutch is assured which eliminates the possibility that the vehicle operator may intentionally over-slip the clutch during engagement or disengagement. This eliminates excessive clutch wear. Furthermore, due to the metering action at treadle valve 72, essentially the same clutch disengaging force is always applied to piston 48 which therefore always has the same displacement to clutch disengaged position.

The metering action of the treadle valve 72 is as follows:

Upon actuation when valve 123 is unseated to allow pressurized fluid or air to enter chamber 82, fluid or air is transmitted through passage 101 in piston 108 into the pressure balancing chamber 81. The fluid under pressure also acts directly on piston 108. These forces tend to raise the piston cup 100 against stop 113 and to raise piston 108 and valve 123 against the resistance of coil spring 104 and balance spring 102 the effective force of which is determined by the depression of pedal 128 to thereby control the effective size of opening 121 thus assuring that a proper amount of air of fluid pressure is transmitted to the clutch cylinder, depending on pressure needed to separate the clutch plates. To effectively accomplish this, the mechanical pressure means, i.e. separating and return springs in both the clutch mechanism and treadle valve are balanced in respect to each other; that is, the combined forces of the springs in the treadle valve together with the fluid pressure established by the metering action equals the combined spring forces in the clutch mechanism assuring a smooth and instantaneous clutch disengagement or engagement.

Upon removal of the operator's foot from pedal 128 the valve springs restore the parts of the treadle valve 72 to the position shown in the drawing, and the pressure in chamber 82 exhausts through the open passage 112 into chamber 80 above piston 100 and out through exhaust 124. This reduces the pressure in chamber 64, and piston 48 retracts evenly at the same controlled rate as the pressure in the treadle valve is being released depending on how fast the operator releases pedal 128 which determines the effective area of passage 112. As piston 48 retracts, the coil springs 24 which were compressed during clutch disengagement expand to press the friction plates into drive engagement. Here, because of the sensitivity of the metering valve action in combination with the unique clutch motor and balanced spring arrangement, instant but smooth engagement is provided to prevent stalling of the engine on a standing start, because at least initial expansion of spring 24 is controllably resisted by retracting piston 48.

Because of wear on the friction surfaces frequent adjustment had to be made in conventional mechanically actuated clutch devices and the length of the foot pedal or hand lever stroke and pressure to disengage the clutch increased constantly.

The operating mechanism of the present invention provides automatic adjustment of the clutch operating mechanism because of wear in such way that the foot pedal or hand lever and clutch pressure remain constant for the entire life of the clutch. This is achieved by the combination of the balanced metering valve and clutch release motor which provides for full clearance of the clutch release levers throughout the life of the clutch.

Thus there has been provided a controlled air or other fluid actuated friction clutch release operating mechanism which is self-adjusting and provides positive smooth and instant engagement and uniform disengagement of the clutch with resultant minimum of wear because of elimination of the possibility that the vehicle operator may "slip" or "ride" the clutch during engaging and disengaging. Positive and smooth controlled engagement and instantaneous disengagement of the clutch minimizes or prevents the engine from stalling and provides smooth safe gear shifting without the usual "clashing" and subsequent damage to the gears commonly encountered in mechanical transmissions.

Wear and replacement of clutch operating parts is reduced to a minimum as only occassionally new O-rings may have to be installed in the clutch motor thus providing an economical and easy to service clutch operating mechanism.

The present invention may be embodied in other specific forms without departing from the spirit and essential characteristics thereof. Therefore, the present embodiment is being considered in all respects as illustrative only and not restrictive, the scope of the invention being indicated by the appended claims rather than by the foregoing description.

What is claimed and desired to be secured by United States Letters Patent is:

1. In a clutch and clutch control assembly, a friction clutch having spring means normally urging it into engaged condition and at least one movable clutch release lever biased in one direction by said spring means, a fluid pressure motor for actuating said clutch having an element adapted to be displaced under fluid pressure to move said lever against the force of said spring means to disengage the clutch, a fluid pressure system for operating said motor comprising a source of pressure and conduit means containing a metering valve assembly comprising an inlet port and a valve element normally biased to close said port to prevent transmission of fluid pressure to said motor, piston means for operating said valve element and having one side exposed to fluid pressure entering said inlet port, a manually operated control member for said valve assembly, and resilient means operatively connecting said member and the other side of said piston means, whereby when said manual control member is operated to disengage the clutch, said piston means is displaced subject to the opposed control forces of said resilient means and said fluid pressure entering the valve assembly, and when said manual control member is released engagement of said clutch by said spring means is effectively controlled by said piston means of the metering valve assembly, said metering valve assembly comprising a cylinder slidably mounting said piston means and defining an inlet chamber at said one side thereof, said inlet port being provided between the source of pressure and said inlet chamber and said conduit means connecting said inlet chamber directly to said fluid motor, means defining an exhaust port for said chamber and means for closing said exhaust port when said inlet port is opened and when said manual control member is operated to disengage the clutch, and means for applying fluid pressure entering said inlet port to oppose the force exerted by said resilient means on said piston means separately of the fluid pressure acting on said piston means in said inlet chamber.

2. The clutch and clutch control assembly defined in claim 1 wherein said means for applying said fluid pressure entering said inlet port comprises means including a member disposed between said resilient means and said piston means and providing a balancing chamber exposed to said other side of said piston means, and fluid passage means formed in said piston means and establishing fluid communication between said balancing chamber and said inlet chamber.

References Cited in the file of this patent

UNITED STATES PATENTS

| | | |
|---|---|---|
| 918,652 | Bryan | Apr. 20, 1909 |
| 1,291,875 | Herr | Jan. 21, 1919 |
| 2,068,579 | Tatter | Jan. 19, 1937 |
| 2,191,669 | Kress | Feb. 27, 1940 |
| 2,329,742 | Bush et al. | Sept. 21, 1943 |
| 2,386,512 | Smith | Oct. 9, 1945 |
| 2,593,192 | Rockwell | Apr. 15, 1952 |
| 2,665,674 | Metsger et al. | Jan. 12, 1954 |
| 2,757,769 | Roise | Aug. 7, 1956 |